US009979952B2

United States Patent
Lee et al.

(10) Patent No.: US 9,979,952 B2
(45) Date of Patent: May 22, 2018

(54) METHOD OF CREATING A PARALLAX VIDEO FROM A STILL IMAGE

(71) Applicant: HTC Corporation, Taoyuan County (TW)

(72) Inventors: Huai-Che Lee, Taoyuan County (TW); Li-Cheng Chen, Taoyuan County (TW); Yung-Chao Tseng, Taoyuan County (TW); Hsin-Ti Chueh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 621 days.

(21) Appl. No.: 14/321,829

(22) Filed: Jul. 2, 2014

(65) Prior Publication Data

US 2015/0172627 A1 Jun. 18, 2015

Related U.S. Application Data

(60) Provisional application No. 61/915,530, filed on Dec. 13, 2013.

(51) Int. Cl.
*H04N 13/00* (2018.01)
*G06T 7/11* (2017.01)
(Continued)

(52) U.S. Cl.
CPC ............. *H04N 13/026* (2013.01); *G06T 7/11* (2017.01); *G06T 7/194* (2017.01); *H04N 13/0007* (2013.01)

(58) Field of Classification Search
CPC ........ G06T 2207/20144; G06T 7/0081; H04N 13/0007; H04N 13/026
(Continued)

(56) References Cited

U.S. PATENT DOCUMENTS 8,274,530 B2 * 9/2012 Birtwistle ............. G06T 11/001
345/581
8,502,817 B2 * 8/2013 Deb ...................... G06T 19/003
345/419
(Continued)

FOREIGN PATENT DOCUMENTS

CN 101600123 A 12/2009
CN 102740094 A 10/2012
(Continued)

OTHER PUBLICATIONS

Corresponding Taiwanese Office Action that these art references were cited dated Jun. 27, 2016.

*Primary Examiner* — Anner N Holder
(74) *Attorney, Agent, or Firm* — CKC & Partners Co., Ltd.

(57) ABSTRACT

A method for creating a parallax video from a still image includes following steps. Image segmentation is performed for separating at least a foreground object within the still image from an image background of the still image. A blank region of the image background is filled, and the blank region corresponds to where the separated foreground object locates within the still image. A virtual three-dimensional (3D) scene consisting of the foreground object and the image background is created. The virtual 3D scene is analyzed for determining a camera path; and, creating the parallax video by observing the virtual 3D scene with a virtual camera moving along the camera path.

15 Claims, 11 Drawing Sheets

(51) Int. Cl.
*G06T 7/194* (2017.01)
*H04N 13/02* (2006.01)

(58) Field of Classification Search
USPC .......................................................... 348/44
See application file for complete search history.

(56) References Cited

U.S. PATENT DOCUMENTS

| | | | |
|---|---|---|---|
| 2003/0202120 A1 | 10/2003 | Newton | |
| 2007/0110298 A1* | 5/2007 | Graepel | G06K 9/00355 382/154 |
| 2007/0248283 A1* | 10/2007 | Mack | G06T 19/006 382/284 |
| 2008/0246759 A1* | 10/2008 | Summers | G06F 3/0304 345/420 |
| 2009/0116732 A1* | 5/2009 | Zhou | H04N 13/0029 382/154 |
| 2012/0154531 A1 | 6/2012 | Kim et al. | |
| 2012/0162223 A1* | 6/2012 | Hirai | H04N 13/0007 345/419 |
| 2012/0206567 A1 | 8/2012 | Zafarifar et al. | |
| 2012/0293616 A1* | 11/2012 | Kwon | H04N 13/026 348/43 |
| 2013/0050185 A1 | 2/2013 | Xie et al. | |
| 2013/0129193 A1* | 5/2013 | Wang | G06K 9/00208 382/154 |
| 2013/0215220 A1* | 8/2013 | Wang | H04N 13/021 348/43 |
| 2014/0063193 A1* | 3/2014 | Williams | H04N 13/0282 348/46 |
| 2015/0138185 A1* | 5/2015 | Huang | G06T 17/00 345/419 |

FOREIGN PATENT DOCUMENTS

| | | |
|---|---|---|
| CN | 103440660 A | 12/2013 |
| TW | 201142757 A | 12/2011 |
| TW | 201239809 A | 10/2012 |
| TW | 201342308 A | 10/2013 |

* cited by examiner

METHOD OF CREATING A PARALLAX VIDEO FROM A STILL IMAGE

CROSS-REFERENCE TO RELATED APPLICATION

This application claims the priority benefit of U.S. Provisional Application Ser. No. 61/915,530, filed Dec. 13, 2013, and the full disclosures of which are incorporated herein by reference.

BACKGROUND

Field of Invention

The present application relates to an image processing method. More particularly, the present application relates to how to apply a parallax effect onto a still image.

Description of Related Art

Recently, people get used to record their daily life by shooting photographs, and they can review the photographs in a digital album on their devices. After the photos are captured, some users may perform some post processes to the photographs, such as filtering, warping, and applying various parametric transformations. However, aforesaid effects are limited by contents of the original image. User can only observes objects and background scene in the photographs in the original way as the photograph was taken.

In general, animations or videos are more attractive to users in comparison with still images, because the users can observes how the object moves in the scene. The animations or the videos occupy much more storage space, such that some users prefer to shoot photographs then filming a video. In general, it is easy to generate a still image from a video by taking a screenshot, but it is hard to establish an animation or a video from a still image.

SUMMARY

This disclosure provides a method and a system for creating a parallax video from a still image. The parallax video provides user a chance to observe the still image from different simulated visual angle, such that a 2.5D or 3D-alike effect is applied on the still image.

An aspect of the present disclosure is to provide a method for creating a parallax video from a still image. The method includes steps of: performing an image segmentation for separating at least a foreground object within the still image from an image background of the still image; filling a blank region of the image background, the blank region corresponding to where the separated foreground object locates within the still image; creating a virtual three-dimensional (3D) scene consisting of the foreground object and the image background; analyzing the virtual 3D scene for determining a camera path; and, creating the parallax video by observing the virtual 3D scene with a virtual camera moving along the camera path.

Another aspect of the present disclosure is to provide an electronic apparatus, which includes a data storage module and a control, module. The data storage module is configured for storing a still image. The control module is coupled with the data storage module. The control module includes a segmentation unit, an in-painting unit, a scene simulation unit, a scene analyzer unit and a video generator unit. The segmentation unit is configured for separating at least a foreground object within the still image from an image background of the still image. The in-painting unit is configured for filling a blank region of the image background, the blank region corresponding to where the separated foreground object locates within the still image. The scene simulation unit is configured for creating a virtual three-dimensional (3D) scene consisting of the foreground object and the image background. The scene analyzer unit is configured for analyzing the virtual 3D scene for determining a camera path. The video generator unit is configured for generating a parallax video by observing the virtual 3D scene with a virtual camera moving along the camera path.

Another aspect of the present disclosure is to provide a non-transitory computer readable storage medium, containing instructions for performing a method includes steps of: performing an image segmentation for separating at least a foreground object within the still image from an image background of the still image; filling a blank region of the image background, the blank region corresponding to where the separated foreground object locates within the still image; creating a virtual three-dimensional (3D) scene consisting of the foreground object and the image background; analyzing the virtual 3D scene for determining a camera path; and, creating a parallax video by observing the virtual 3D scene with a virtual camera moving along the camera path.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
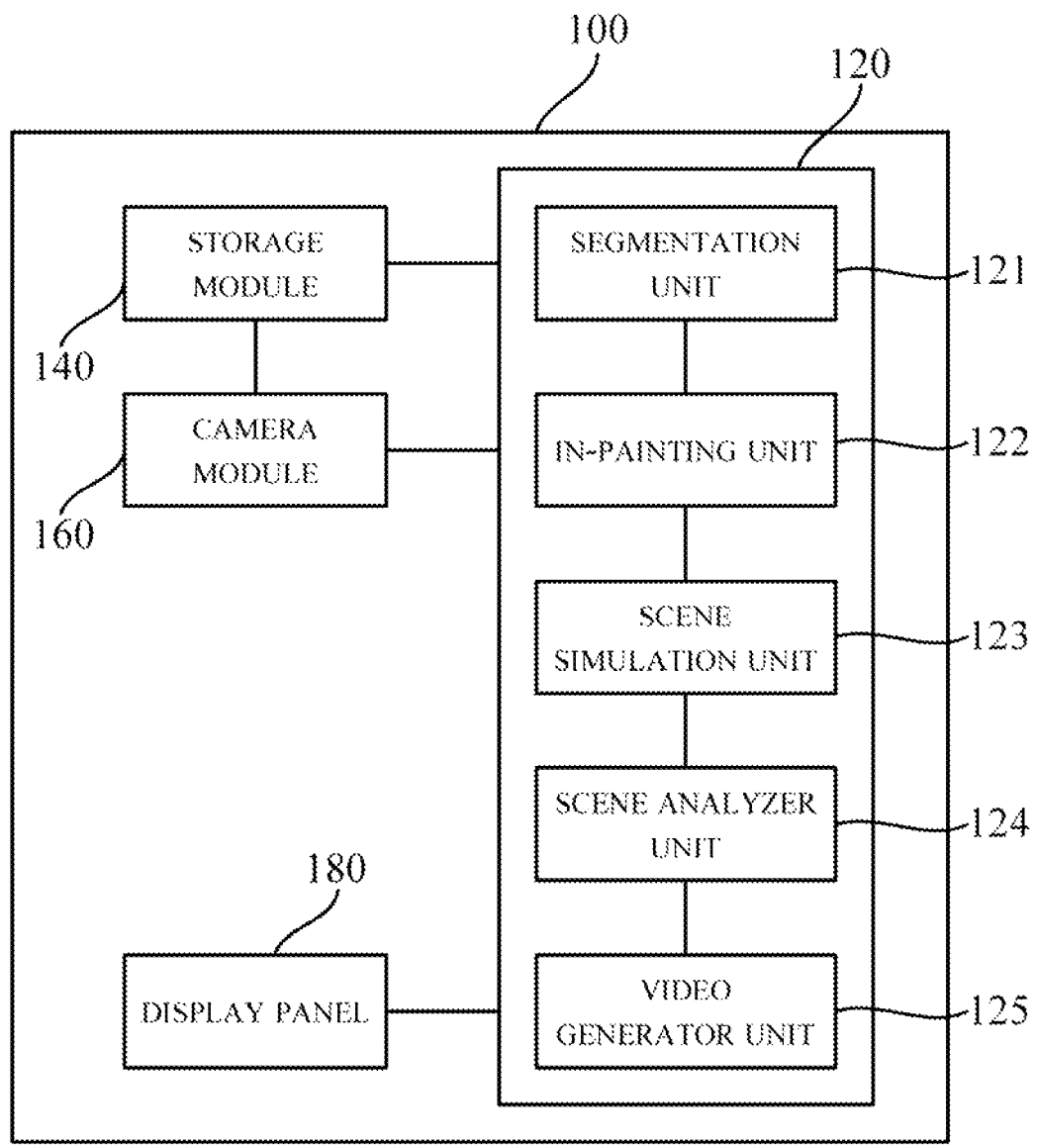
FIG. 1 is a schematic diagram illustrating an electronic apparatus according to an embodiment of the disclosure.

Reference is made to FIG. 1, which is a schematic diagram illustrating an electronic apparatus 100 according to an embodiment of the disclosure. As shown in FIG. 1, the electronic apparatus 100 includes a control module 120 and a data storage module 140. In some embodiments, there are some still images stored in the data storage module 140. The data storage module 140 can be a memory card, a hard-drive or a communication unit connected to an on-line storage server. The control module 120 of the electronic apparatus 100 is able to create a parallax video (or a parallax animation) from the still image. The control module 120 is configured to establish a virtual three-dimensional (3D) scene simulated from the still image. During the parallax video, the user can observe the virtual 3D scene (i.e., the still image) from different visual angles, such as to provide users different views and 3D-alike experiences toward the still image. Details of how to create the parallax video from the still image is explained in following paragraphs.

In some embodiments, the electronic apparatus 100 further includes a camera module 160 and a display panel 180. Aforesaid still image can be captured by the camera module 160 of the electronic apparatus 100, but the disclosure is not limited to this. The still image can also be a photograph inputted from other devices (e.g., a digital camera or a smartphone other than the electronic apparatus 100), an image downloaded over internet, etc. The parallax video created by the still image can be shown on the display panel 180 such as 2D display panel.

The control module 120 of the electronic apparatus 100 includes a segmentation unit 121, an in-painting unit 122, a scene simulation unit 123, a scene analyzer unit 124 and a video generator unit 125. The control module 120 can be a central processor unit (CPU), a graphic processing unit (GPU), an image processing circuit, or an equivalent computing circuit. The segmentation unit 121, the in-painting unit 122, the scene simulation unit 123 the scene analyzer unit 124 and the video generator unit 125 can be realized by software instructions/programs executed by the control module 120, firmware instructions/programs or circuits for executing specific applications.

Figure 2:
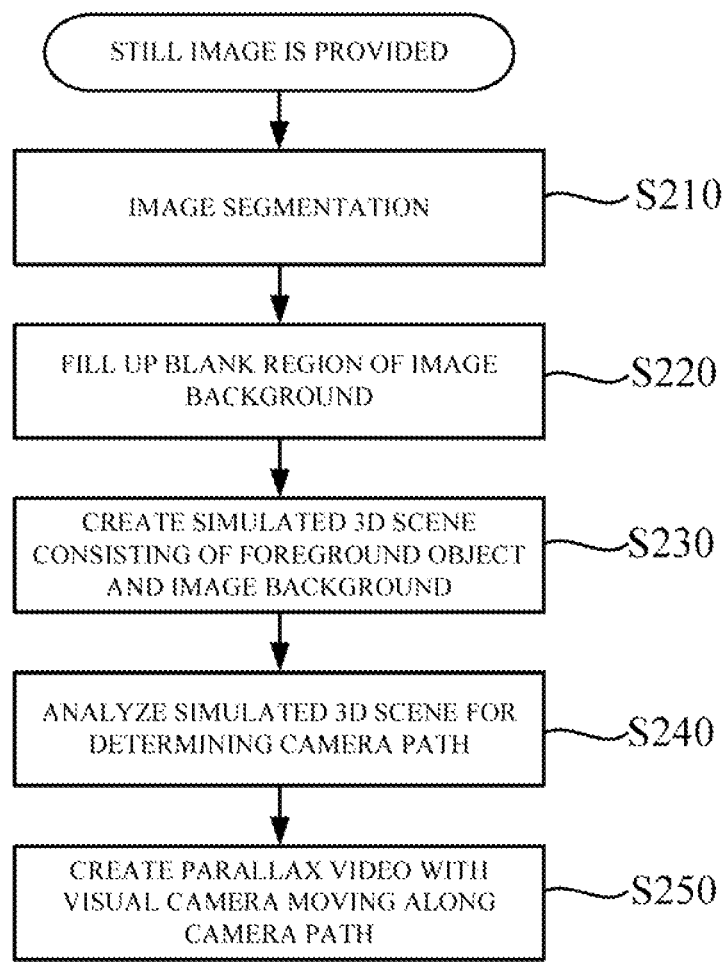
FIG. 2 is a flow-chart diagram illustrating a method for creating a parallax video from a still image according to an embodiment of the disclosure.
Figure 4A:
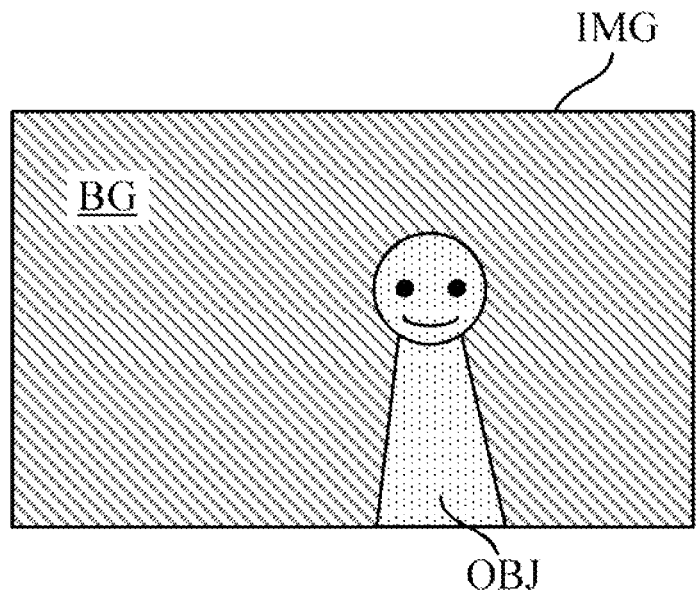
FIG. 4A illustrates an example of the still image in a demonstrational case according to an embodiment of the disclosure.
Figure 4B:
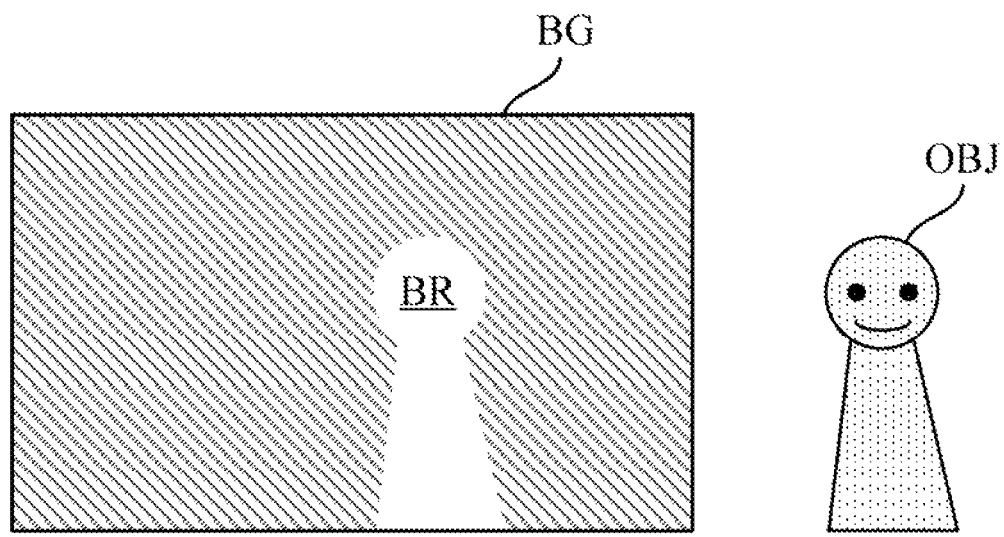
FIG. 4B illustrates an image segmentation result of the still image shown in FIG. 4A.

Reference is also made to FIG. 2. FIG. 2 is a flow-chart diagram illustrating a method 200 for creating a parallax video from a still image according to an embodiment of the disclosure. In some embodiments, the method 200 can be executed by the electronic apparatus 100 shown in FIG. 1. As shown in FIG. 2, after the still image is provided (the still image is existed in the data storage module 140 or the still image is captured by the camera module 160), the method 200 executes step S210 for performing an image segmentation for separating at least a foreground object within the still image from an image background of the still image by the segmentation unit 121. Reference is also made to FIG. 4A and FIG. 4B. FIG. 4A illustrates an example of the still image IMG in a demonstrational case according to an embodiment of the disclosure. FIG. 4B illustrates an image segmentation result of the still image IMG shown in FIG. 4A.

As shown in FIG. 4A and FIG. 4B, the original still image IMG includes a foreground object OBJ (e.g., a person in this demonstrational case) and an image background BG. In some applications, the segmentation unit 121 can analyze depth distributions within the still image IMG (e.g. generating a depth histogram of the still image IMG), and identify objects within the still image IMG by the depth distributions, so as to identify the foreground object OBJ from the image background BG. After the foreground object OBJ is identified, the segmentation unit 121 separates pixels of the foreground object. OBJ apart from the image background BG (as shown in FIG. 4B). The original data of aforesaid pixels are removed from the still image IMG to form the image background BG, such that a blank region BR (as shown in FIG. 4B) is left on the image background BG. In other words, the blank region BR corresponds to where the separated foreground object OBJ locates within the still image IMG.

In other cases, the original still image IMG may include more than one foreground object. The foreground object is not limited to a person, and it can be a car, a pet, a store, an item, a sign or any object which is located at a specific depth and able be separated from the image background BG.

Figure 3A:
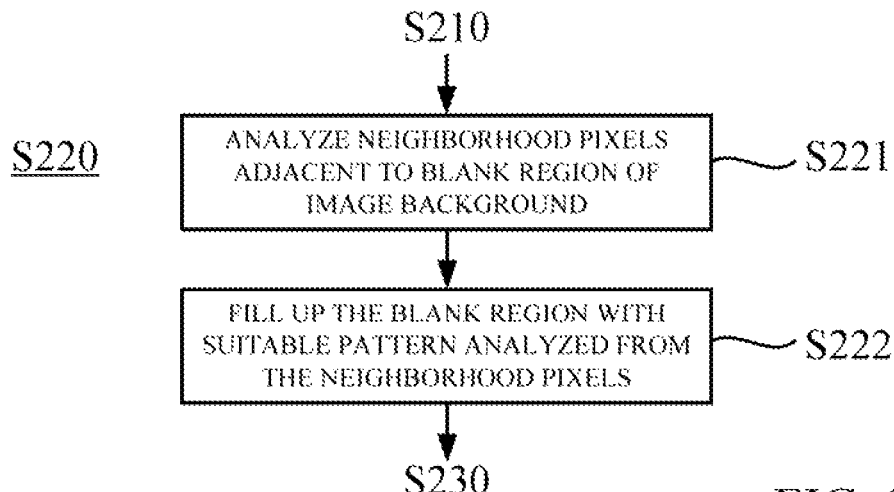
FIG. 3A is a flow-chart diagram illustrating further steps according to an embodiment of the disclosure.
Figure 4C:
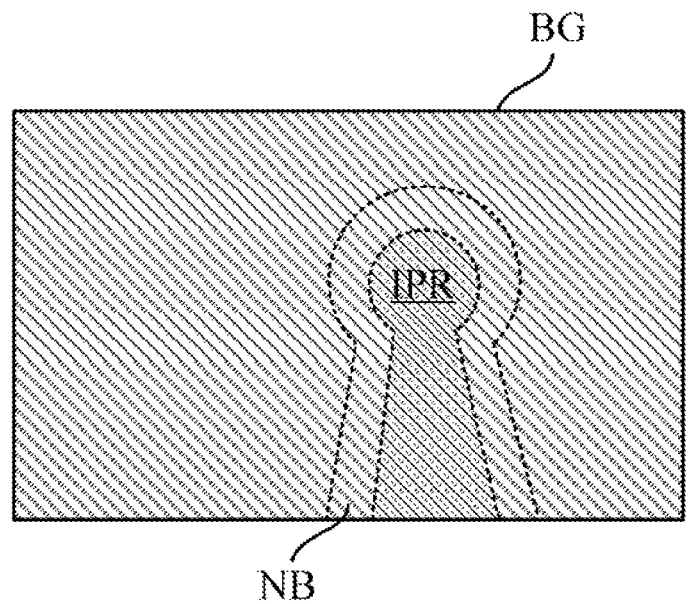
FIG. 4C illustrates the image background in the demonstrational case.

The method 200 executes step S220 for filling the blank region BR of the image background BG by the in-painting unit 122. Reference is also made to FIG. 3A and FIG. 4C. FIG. 3A is a flow-chart diagram illustrating further steps S221-S222 of step S220 shown in FIG. 2 according to an embodiment of the disclosure. FIG. 4C illustrates the image background BG in the demonstrational case. In this embodiment, step S221 is executed for analyzing neighborhood pixels NB adjacent to the blank region of the image background. Step S222 is executed for filling the blank region BR (referring to FIG. 4B) up into an in-painting region IPR (referring to FIG. 4C) with a suitable pattern analyzed from the neighborhood pixels NB.

In an embodiment, the in-painting unit 122 analyzes colors of each of the neighborhood pixels NB, finds out average values (or mode values, or medium values) of R/G/B data of the neighborhood pixels NB, and paint the blank region BR into the in-painting region IPR with an average color (or the most common color, or the medium color) of the neighborhood pixels NB. In another embodiment, the in-painting unit 122 further analyzes strips, shapes, edges, regular patterns within the neighborhood pixels NB, and fill the blank region BR up according to the pattern of the neighborhood pixels NB. The in-painting unit 122 is configured to simulate or predict the contents within the blank region BR (i.e., the in-painting region IPR) even though the contents of the blank region BR is not recorded in the original still image IMG, so as to make the in-painting region IPR unnoticeable by users as possible.

Figure 4D:
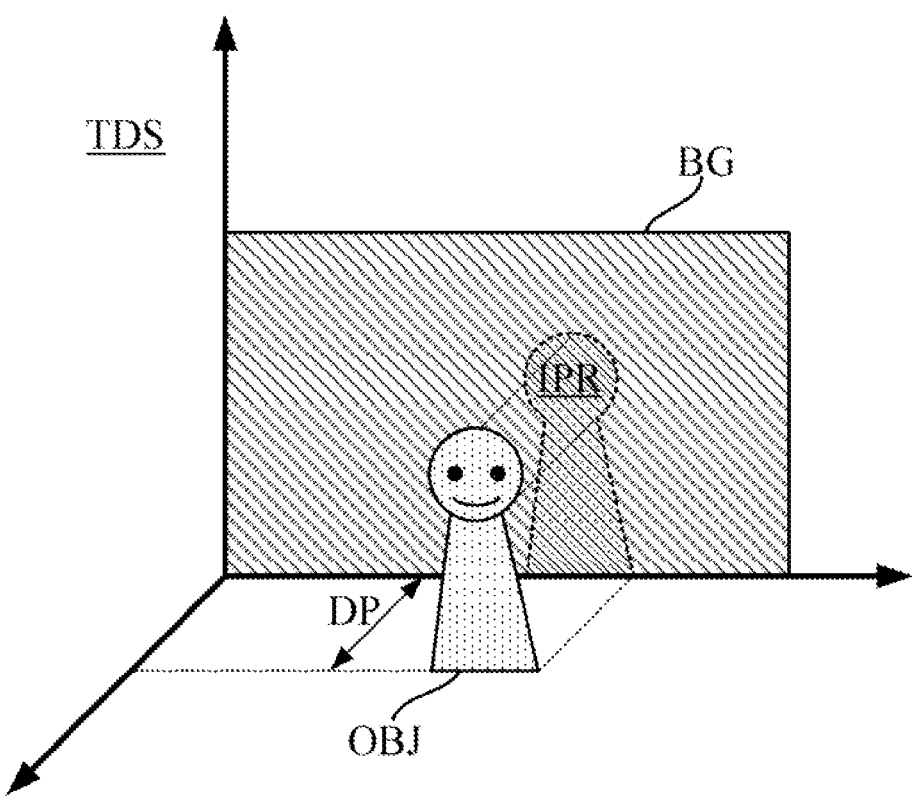
FIG. 4D illustrates the virtual 3D scene in the demonstrational case.

The method 200 executes step S230 for creating a virtual three-dimensional (3D) scene consisting of the foreground object OBJ and the image background BG by the scene simulation unit 123. Reference is also made to FIG. 4D, which illustrates the virtual 3D scene TDS in the demonstrational case. As shown in FIG. 4O, the virtual 3D scene TDS consists of the foreground object OBJ and the image background BG, and the foreground object OBJ is configured to be located in front of the image background BG by a depth difference DP. The depth difference DP can be determined or calculated according to the depth histogram of the still image IMG. As shown in FIG. 4D, the foreground object OBJ and the image background BG are now located at different depths in the virtual 3D scene TDS. When an observing spots is moving (e.g., moving vertically or horizontally), the foreground object OBJ in the virtual 3D scene TDS will be viewed to be located at different positions relative to the background BG. In some embodiments, the virtual three-dimensional scene is established by a 3D simulator, a virtual reality scene generator, a 3D modeling process or any equivalent simulator in accordance with the foreground object. OBJ, the image background BG and the depth distributions thereof. Further details of how to establish a virtual 3D scene are known by a person in the art and not to be discussed here.

Figure 4E:
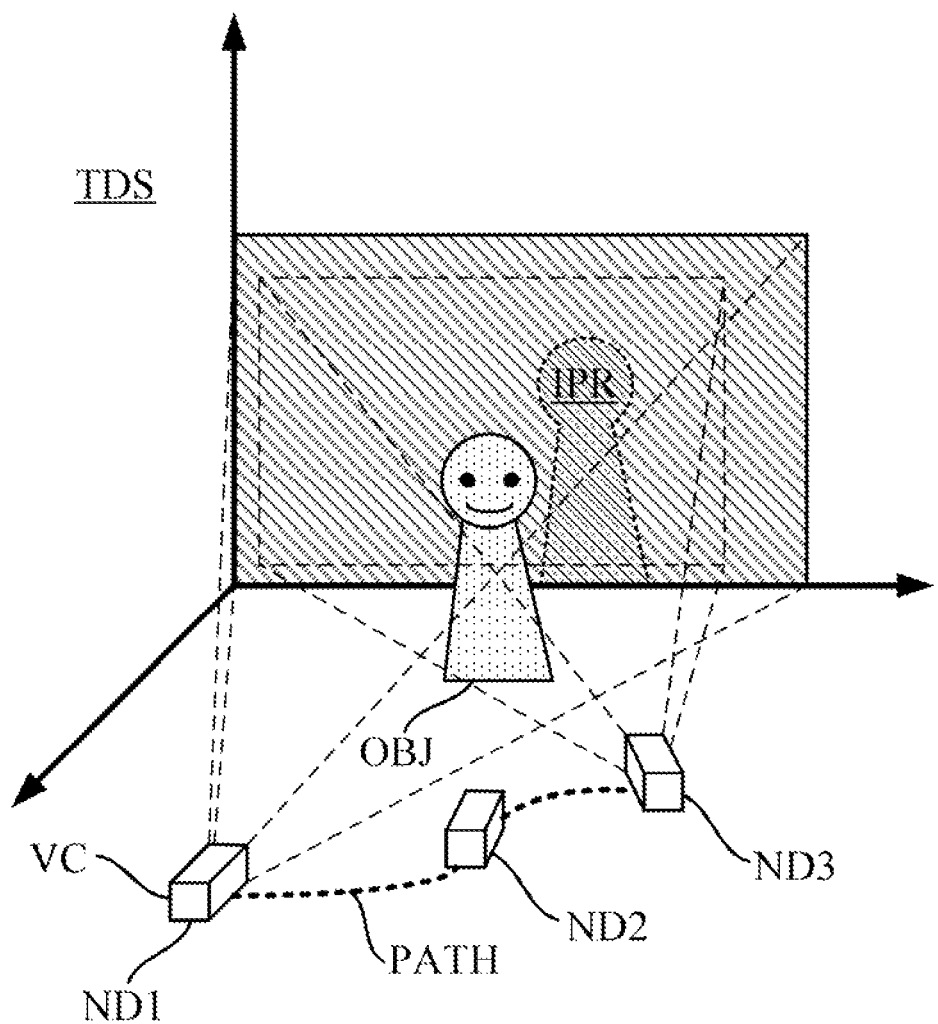
FIG. 4E and FIG. 4F illustrate the virtual camera moving relative to the virtual 3D scene in the demonstrational case.
Figure 4F:
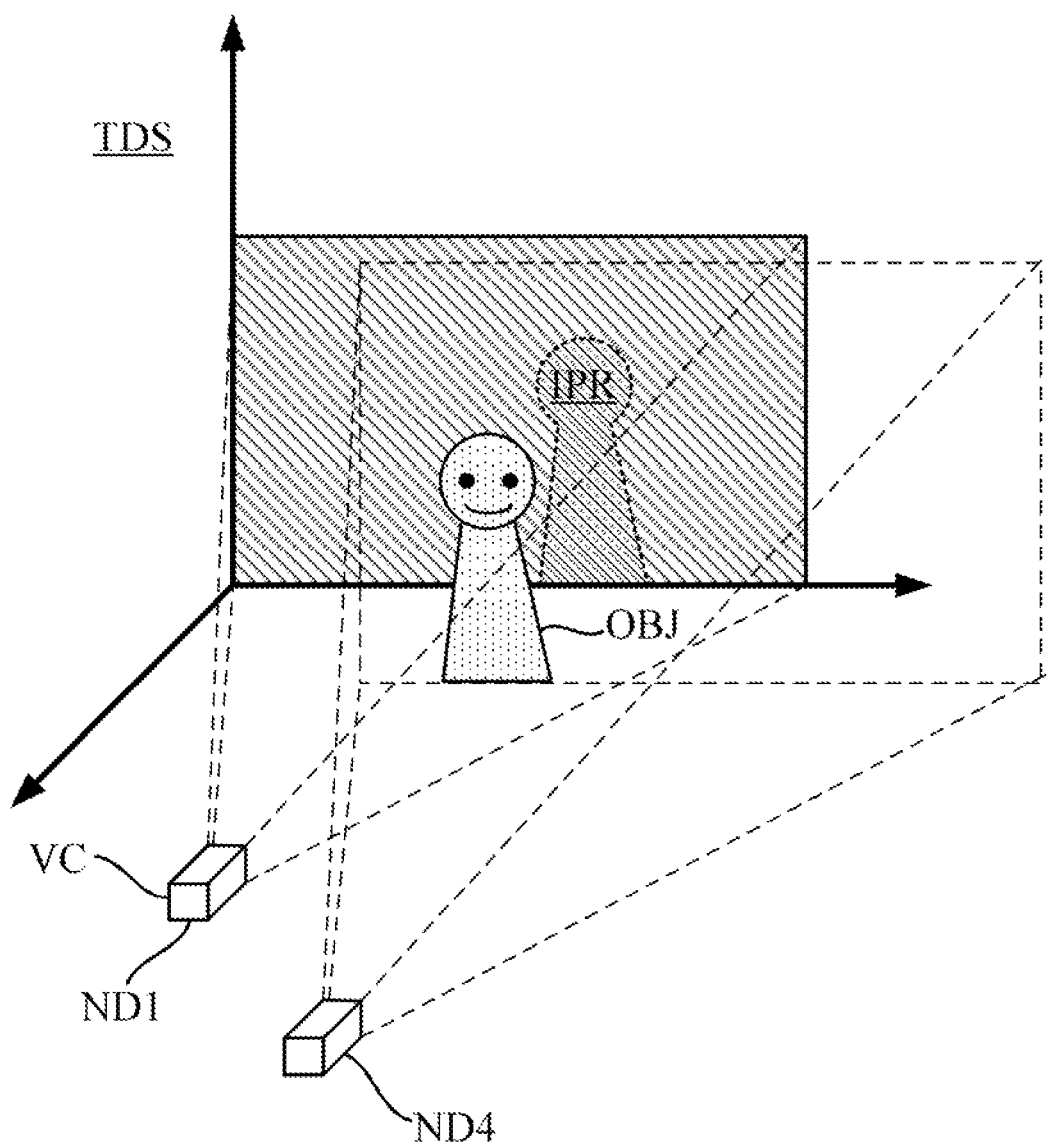

Afterward, the method 200 executes step S240 for analyzing the virtual 3D scene TDS for determining a camera path by the scene analyzer unit 124. Then, the method 200 executes step S250 for creating the parallax video by observing the virtual 3D scene TDS with a virtual camera moving along the camera path by the video generator unit 125. Reference is also made to FIG. 4E and FIG. 4F. FIG. 4E and FIG. 4F illustrate the virtual camera VC moving relative to the virtual 3D scene TDS in the demonstrational case. As shown in FIG. 4E, the video generator unit 125 simulates the virtual camera VC moving from the node ND1 via the node ND2 to the node ND3 along the camera path PATH. The virtual camera VC observed at the nodes ND1, ND2 and ND3 will observe the virtual 3D scene TDS from different visual angles and different distances, such that visual windows observed by the virtual camera VC at the nodes ND1 ND2 and ND3 will be quite different from each others. The relationship between the foreground object OBJ and the in-painting region IPR observed by the virtual camera VC at the nodes ND1, ND2 and ND3 are also different. Accordingly, the parallax video is created to display the still image in a more vivid way.

However, the camera path PATH of the virtual camera VC can not be a random path. For example, when the virtual camera VC is moved to a node (referring to the node ND4 as shown in FIG. 4F) too far from the foreground object OBJ and the image background BG, a visual window of the virtual camera VC from the node ND4 can not be completely covered by the virtual 3D scene, and the visual window go beyond the boundary of the image background BG. The original still image IMG has no data about pixels outside the boundary of the image background BG. Therefore, if the visual window goes beyond the boundary of the image background BG, a part of the visual window observed by the virtual camera VC will be void without any valid pixel data. On the other hands, the in-painting region IPR filled up by the in-painting unit 122 is not really existed in the original still image IMG. If a large portion of the in-painting region IPR is revealed to the user, the user may notice some flaws or unnatural bugs within the in-painting region IPR. Therefore, the camera path PATH must be planned carefully to optimize the parallax video.

Figure 3B:
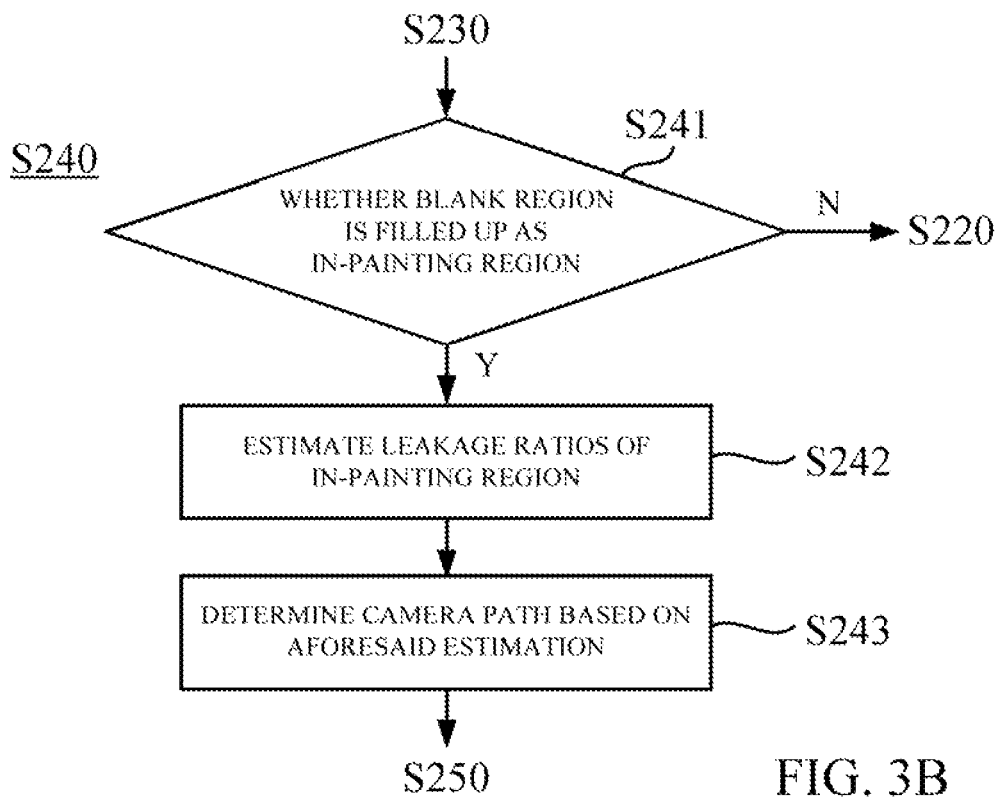
FIG. 3B is a flow-chart diagram illustrating further steps according to an embodiment of the disclosure.

In this embodiment, the camera path PATH is determined in step S240 according to analysis of the virtual 3D scene. Reference is also made to FIG. 3B, which is a flow-chart diagram illustrating further steps S241~S243 of step S240 shown in FIG. 2 according to an embodiment of the disclosure. As shown in FIG. 3B, step S241 is executed for determining whether the blank region BR (referring to FIG. 4B) of the image background BG is filled as the in-painting region (referring to FIG. 4C). In some embodiments, the blank region BR is completely filled up with the suitable pattern as the in-painting region IPR. However, the disclosure is not limited to this. In some other embodiment, at least part of the blank region BR (e.g. a part adjacent to edges of the blank region BR) is filled with the suitable pattern as the in-painting region IPR, and another part of the blank region BR (e.g., a part adjacent to a center of the blank region BR) remains blank without display data. In this case, step S241 is executed for determining whether the blank region BR (referring to FIG. 4B) of the image background BG is at least partially filled as the in-painting region.

Step S241 in this embodiment is an optional step for double checking whether the blank region BR is filled as the in-painting region IPR. If the blank region BR is not filled, the method 200 returns to step S220.

Figure 4H:
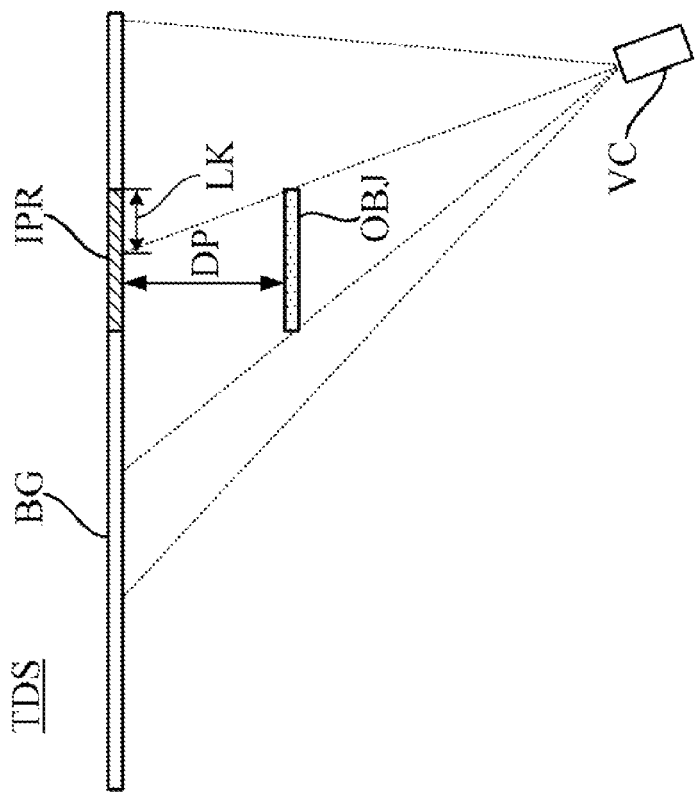
FIG. 4G and FIG. 4H illustrate examples of different leakage ratios of the in-painting region IPR in the demonstrational case; and FIG. 5A to FIG. 5D is a schematic diagram illustrating the camera path.
Figure 4G:
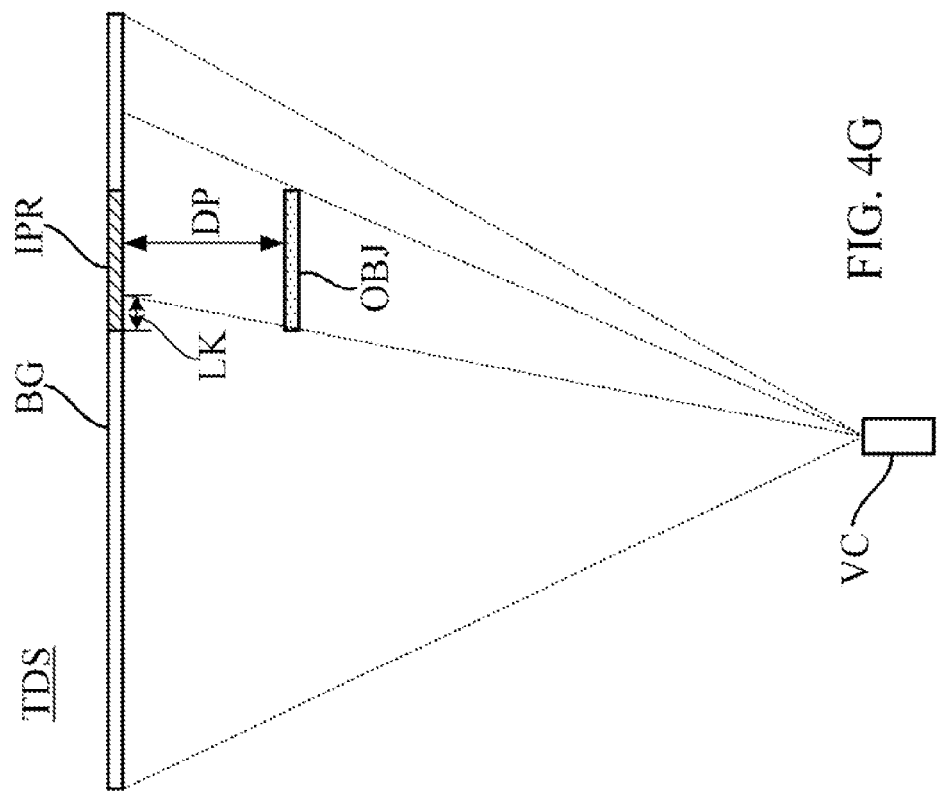

If the blank region BR is filled as the in-painting region IPR, step S242 is executed for estimating different leakage ratios of the in-painting region IPR. Step S243 is executed for determining the camera path PATH based on aforesaid estimation. The leakage ratios correspond to how much the in-painting region IPR is observable from different candidate nodes by the virtual camera VC in the virtual 3D scene TDS. Reference is also made to FIG. 4G and FIG. 4H, which illustrate examples of different leakage ratios of the in-painting region IPR in the demonstrational case.

As shown in FIG. 4G the virtual camera is substantially located in front of a center of the image background BG. A projection area of the foreground object OBJ (observed from the virtual camera) is formed on the image background BG. The projection area of the foreground object OBJ on the image background BG overlaps about 75% of the in-painting region IPR in FIG. 4G. In this case, a leakage region LK of the in-painting region IPR will be observable by the virtual camera VC. The leakage ratio is calculated in this case shown in FIG. 4G is about 25% (i.e., a percentage between the observable area and the total area of the in-painting region IPR).

As shown in FIG. 4H, the virtual camera is moved to the right side in front of the image background BG. Another projection area of the foreground object OBJ (observed from the virtual camera) is formed on the image background BG. The projection area of the foreground object OBJ on the image background BG overlaps about 55% of the in-painting region IPR in FIG. 4H. In this case, another leakage region LK of the in-painting region IPR will be observable by the virtual camera VC. The leakage ratio in this case shown in FIG. 4H is about 45%. According to practical experiences, flaws or bugs of the in-painting region IPR will be easy to notice when the leakage ratio is higher than 50%. In some embodiments, the scene analyzer unit 124 determines the camera path according to the leakage ratios of nodes on the camera path PATH, so as to ensure that each of nodes along the camera path PATH has a leakage ratio less than 50%. Furthermore, in the embodiments that the blank region BR is partially filled as the in-painting region IPR, the remaining part of the blank region BR without display data is not allowed to be observable by the virtual camera VC, and the determination of the camera path PATH is required to avoid the leakage of the remaining part of the blank region BR without display data.

Figure 3C:
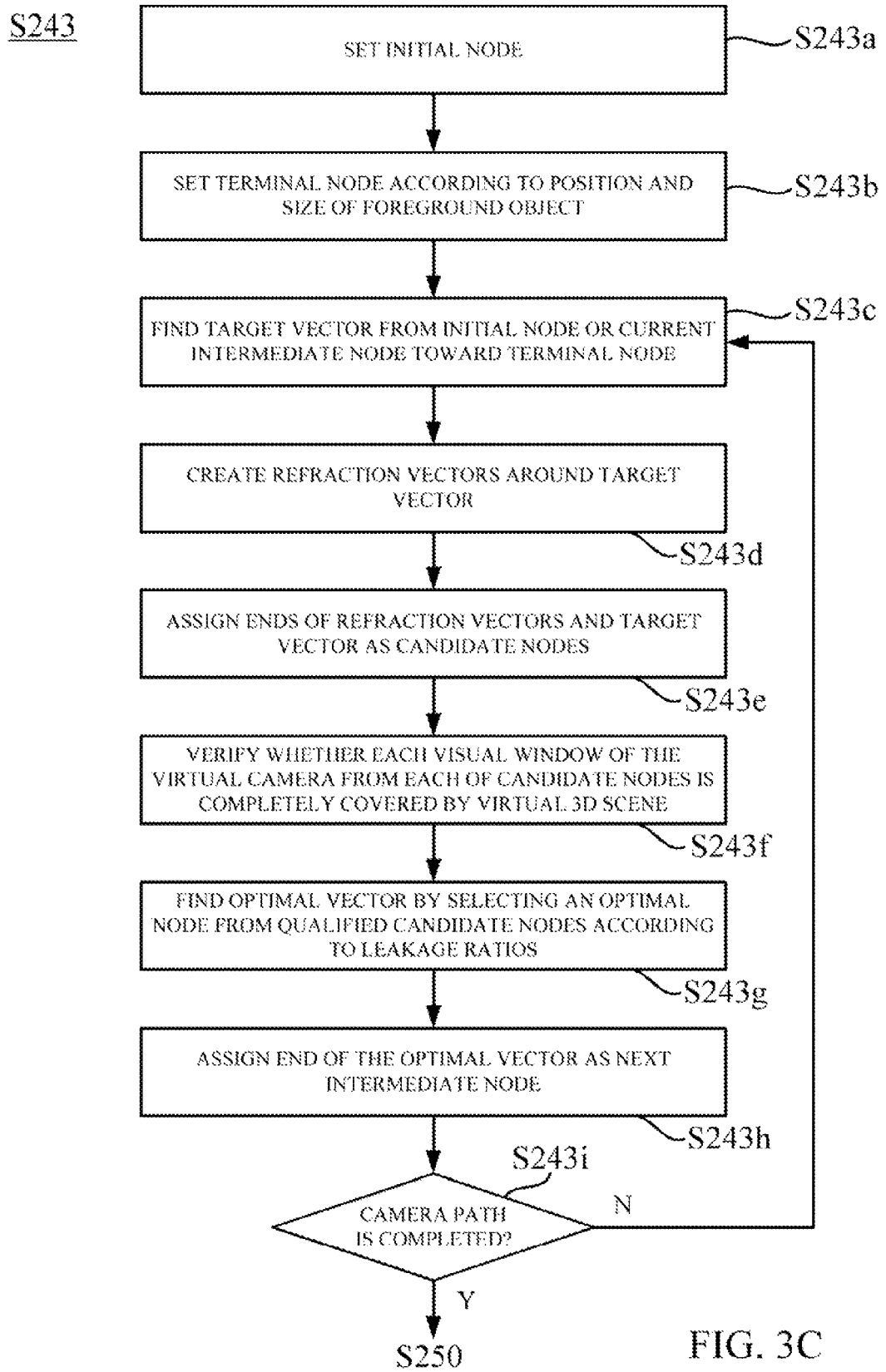
FIG. 3C is a flow-chart diagram illustrating further detail steps shown in FIG. 3B for demonstrating how the camera path is determined according to an embodiment of the disclosure.

Reference is made to FIG. 3C and FIG. 5A to FIG. 5D. FIG. 3C is a flow-chart diagram illustrating further detail steps S243a~S243i of step S243 shown in FIG. 3B for demonstrating how the camera path PATH is determined according to an embodiment of the disclosure. FIG. 5A to FIG. 5D is a schematic diagram illustrating the camera path PATH.

Figure 5A:
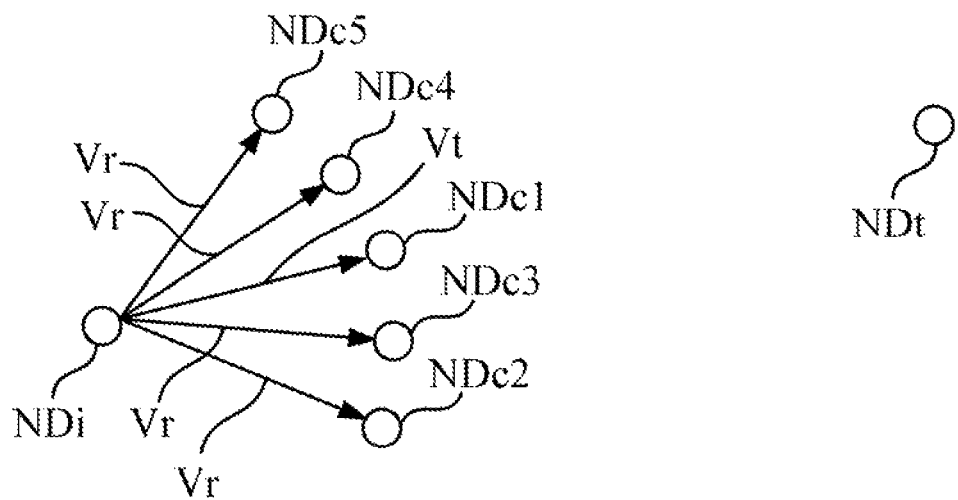
Figure 5B:
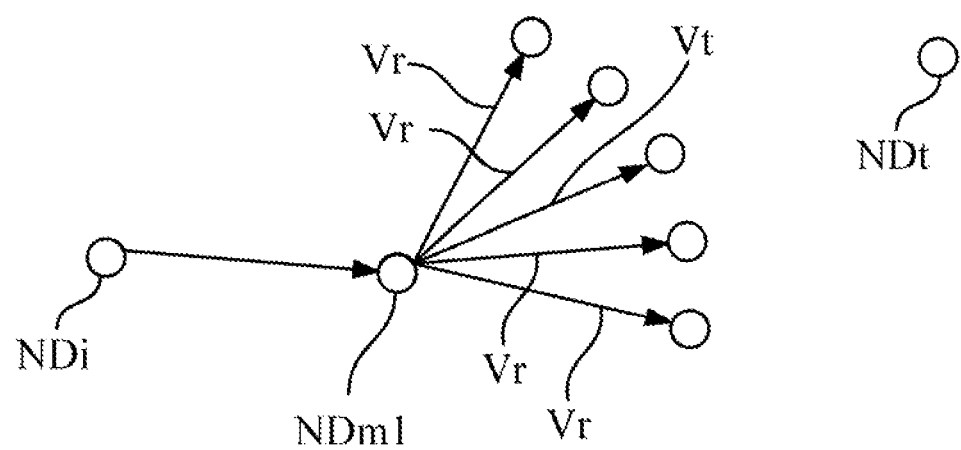
Figure 5C:
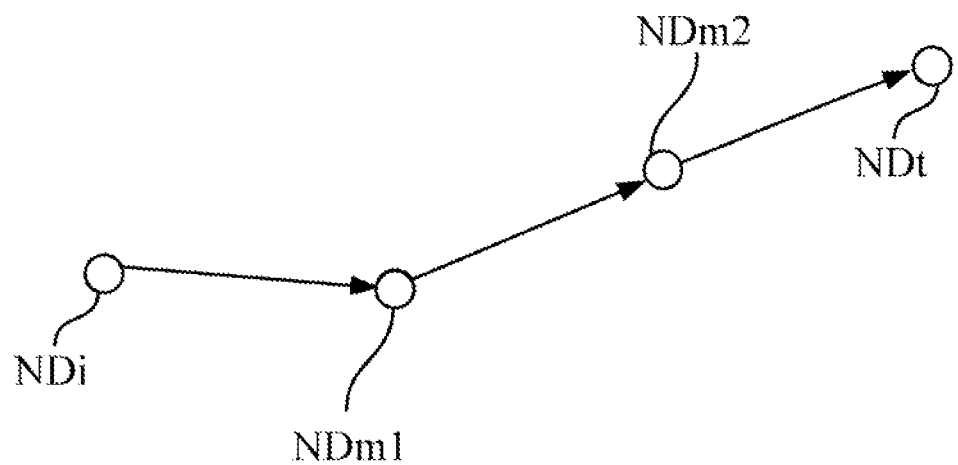

As shown in FIG. 5C, the camera path PATH includes an initial node NDi, a terminal node NDt and at least one intermediate node (in the embodiment shown in FIG. 5C, there are two intermediate nodes NDm1, NDm2) between the initial node NDi and the terminal node NDt.

As shown in FIG. 3C, step S243a is executed for setting the initial node NDi. In some embodiments, the initial node NDi can be set at an original viewing point (i.e., where the user takes the still image IMG in the first place) of the still image IMG. For example, a focal distance of the still image IMG is known and recorded along the still image IMG. Therefore, the original viewing point can be located along a vertical axis extending from the center of the still image IMG according to the focal distance. Step S243b is executed for setting the terminal node NDt according to a position and a size of the foreground object OBJ within the still image IMG.

In some embodiments, the terminal node NDt is set to a right side from the initial node NDi when the position of the foreground object OBJ is located at a right half of the still image IMG; on the other hand, the terminal node NDt is set to a left side from the initial node NDi when the position of the foreground object OBJ is located at a left half of the still image IMG; such that the visual camera can move from one side relative to the foreground object OBJ to the other side relative to the foreground object OBJ, and the parallax video created in this way will has opposite views relative to the foreground object OBJ.

As shown in FIG. 3C and FIG. 5A, step S243c is executed for finding a target vector Vt from the initial node NDi toward the terminal node NDt. Step S243d is executed for creating refraction vectors Vr around the target vector Vt. Step S243e is executed for assigning ends of the refraction vectors Vr and target vector Vt as the candidate nodes NDc1~NDc5. The refraction vectors Vr are created along an orientation of the target vector Vt with different angles deviated from the target vector Vt.

As shown in FIG. 3C and FIG. 5A, step S243f is executed for verifying whether each visual window of the virtual camera VC from each of the candidate nodes NDc1~NDc5 is completely covered by the virtual 3D scene TDS (referring to FIG. 4E and FIG. 4F). If any visual window exceeds the virtual 3D scene TDS, the corresponding candidate node is disqualified (e.g., the node ND4 in FIG. 4F will be disqualified). When the visual window is completely covered by the virtual 3D scene TDS, the corresponding candidate node is qualified (e.g., the nodes ND1, ND2, ND3 in FIG. 4E will be qualified). In this case, it assumes that the candidate nodes NDc4 and NDc5 are disqualified in step S243f.

As shown in FIG. 3C and FIG. 5A, step S243g is executed for finding the optimal vector by selecting an optimal node from the qualified candidate nodes (NDc1, NDc2, NDc3) according to the leakage ratios. The leakage ratio of the optimal node of the camera path is less than a criteria upper bound. In some embodiment, the criteria upper bound is that 50% of the in-painting region IPR is observable by the virtual camera VC from one of the candidate nodes NDc1, NDc2, NDc3. The optimal node is selected from the qualified candidate nodes with their leakage ratio less than 50%. In some embodiment, the optimal node is further elected from the qualified candidate nodes with their leakage ratio more than 20% and less than 50%, such that the parallax effect between the foreground object and the image background will be more noticeable to users. In this case, it assumes that the qualified candidate nodes NDc3 is selected as the optimal node, and the refraction vector Vr corresponding to the candidate nodes NDc3 is selected as the optimal vector.

As shown in FIG. 3C and FIG. 5A, step S243h is executed for assigning an end (i.e., the candidate nodes NDc3) of the optimal vector as a next intermediate node NDm1.

Step S243i is executed for determining whether the camera path PATH is completed. When the camera path PATH is not completed, it goes to repeat steps S243c~S243h.

As shown in FIG. 5B, the intermediate node NDm1 is the current intermediate node NDm1 Step S243c is executed for finding a target vector Vt from the current intermediate node NDm1 toward the terminal node NDt. Steps S243d to S243h is further executed for assign the next intermediate node NDm2. Then, the Steps S243c to S243h are repeated until the camera path PATH is completed.

Figure 5D:
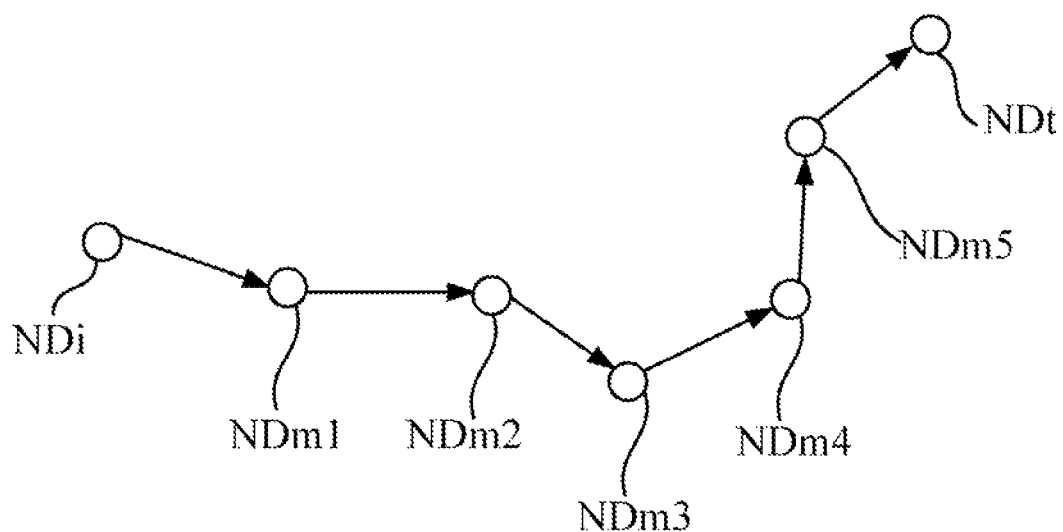

In the embodiment shown in FIG. 5A to FIG. 5C, there are two intermediate nodes NDm1 and NDm2, but the disclosure is not limited to this. As shown in FIG. 5D according to some other embodiments, the camera path PATH can includes more intermediate nodes, such as the intermediate nodes NDm1~NDm5 shown in FIG. 5D.

Another embodiment of the disclosure is a non-transitory computer readable storage medium. The non-transitory computer readable storage medium contains instructions for performing the method 200 in aforesaid embodiment shown in FIG. 2, FIG. 3A to FIG. 3C.

Based on aforesaid embodiment, the disclosure provides a method and an electronic apparatus capable of creating a parallax video from a still image, such that user can experience a 2.5D or 3D-alike animation effect generated from any still image. While the parallax video is created by a virtual camera, the method will automatically determine an optimal camera path for the virtual camera, such that the parallax video can show objects within the still image from different visual angles with diversity, and also prevent the user from seeing too much leakage of the in-painting region.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims.

What is claimed is:

1. A method for creating a parallax video from one singular still image, the method comprising:
   performing an image segmentation for separating at least a foreground object within the singular still image from an image background of the singular still image;
   filling a blank region of the image background, the blank region corresponding to where the separated foreground object locates within the singular still image;
   creating a virtual three-dimensional (3D) scene from the singular still image, the virtual 3D scene consisting of the foreground object and the image background from the singular still image;
   analyzing the virtual 3D scene created from the singular still image for determining a camera path; and
   creating the parallax video by observing the virtual 3D scene with a virtual camera moving along the camera path,
   wherein the step of analyzing the virtual 3D scene for determining the camera path comprises:
      determining whether the blank region of the image background is at least partially filled as an in-painting region; and
      estimating different leakage ratios of the in-painting region corresponding to how much the in-painting region is observable from different candidate nodes by the virtual camera in the virtual 3D scene.

2. The method of claim 1, wherein, in the virtual 3D scene, the foreground object is configured to be located in front of the image background by a depth difference.

3. The method of claim 1, wherein the step of filling the blank region comprises:
   analyzing neighborhood pixels adjacent to the blank region of the image background; and
   filling the blank region with a suitable pattern analyzed from the neighborhood pixels.

4. The method of claim 1, wherein the camera path comprises an initial node, a terminal node and at least one intermediate node, the step of determining the camera path further comprises:
   setting the initial node at an original viewing point of the singular still image;
   setting the terminal node according to a position and a size of the foreground object within the singular still image; and determining the at least one intermediate node between the initial node and the terminal node.

5. The method of claim 4, wherein the at least one intermediate node of the camera path is determined node-by-node from the initial node to the terminal node, the step of determining each of the at least one intermediate node comprises:
 finding a target vector from the initial node or a current intermediate node toward the terminal node;
 creating a plurality of refraction vectors around the target vector; and
 finding an optimal vector from the refraction vectors and target vector, and assigning an end of the optimal vector as a next intermediate node.

6. The method of claim 5, wherein the step of finding the optimal vector from the refraction vectors and target vector further comprises:
 assigning ends of the refraction vectors and target vector as the candidate nodes;
 verifying whether each visual window of the virtual camera from each of the candidate nodes is completely covered by the virtual 3D scene, wherein if any visual window exceeds the virtual 3D scene, the corresponding candidate node is disqualified;
 calculating the leakage ratios corresponding to the qualified candidate nodes; and
 finding the optimal vector by selecting an optimal node from the qualified candidate nodes according to the leakage ratios, such that the leakage ratio of the optimal node of the camera path is less than a criteria upper bound.

7. The method of claim 6, wherein the criteria upper bound is that 50% of the in-painting region is observable by the virtual camera from one of the candidate nodes.

8. The method of claim 5, wherein the refraction vectors are created along an orientation of the target vector with different angles deviated from the target vector.

9. The method of claim 4, wherein the terminal node is set to a right side from the initial node when the position of the foreground object is located at a right half of the singular still image, and the terminal node is set to a left side from the initial node when the position of the foreground object is located at a left half of the singular still image.

10. An electronic apparatus, comprising:
 a data storage module; and
 a control module, coupled with the data storage module, the control module comprising:
  a segmentation unit configured for separating at least a foreground object within one singular still image stored in the data storage module from an image background of the singular still image;
  an in-painting unit configured for filling a blank region of the image background, the blank region corresponding to where the separated foreground object locates within the singular still image;
  a scene simulation unit configured for creating a virtual three-dimensional (3D) scene consisting of the foreground object and the image background from the singular still image;
  a scene analyzer unit configured for analyzing the virtual 3D scene created from the singular still image for determining a camera path; and
  a video generator unit configured for generating a parallax video by observing the virtual 3D scene with a virtual camera moving along the camera path,
 wherein the scene analyzer unit determines whether the blank region of the image background is filled as an in-painting region, the scene analyzer unit estimates different leakage ratios of the in-painting region corresponding to how much the in-painting region is observable from different candidate nodes by the virtual camera in the virtual 3D scene, and the scene analyzer unit determines the camera path according to the leakage ratios.

11. The electronic apparatus of claim 10, wherein the scene simulation unit locates the foreground object in front of the image background by a depth difference in the virtual 3D scene.

12. The electronic apparatus of claim 10, wherein the in-painting unit analyzes neighborhood pixels adjacent to the blank region of the image background, and the in-painting unit fills the blank region with a suitable pattern analyzed from the neighborhood pixels.

13. The electronic apparatus of claim 10, wherein the camera path comprises an initial node, a terminal node and at least one intermediate node, the scene analyzer unit sets the initial node at an original viewing point of the singular still image, and the scene analyzer unit sets the terminal node according to a position and a size of the foreground object within the singular still image.

14. The electronic apparatus of claim 13, wherein the at least one intermediate node of the camera path is determined node-by-node from the initial node to the terminal node, the scene analyzer unit determines each of the at least one intermediate node by finding a target vector from the initial node or a current intermediate node toward the terminal node, creating a plurality of refraction vectors around the target vector, finding an optimal vector from the refraction vectors and target vector, and assigning an end of the optimal vector as a next intermediate node.

15. A non-transitory computer readable storage medium, containing instructions for performing a method comprising:
 performing an image segmentation for separating at least a foreground object within one singular still image from an image background of the singular still image;
 filling a blank region of the image background, the blank region corresponding to where the separated foreground object locates within the singular still image;
 creating a virtual three-dimensional (3D) scene consisting of the foreground object and the image background from the singular still image;
 analyzing the virtual 3D scene created from the singular still image for determining a camera path; and
 creating a parallax video by observing the virtual 3D scene with a virtual camera moving along the camera path,
 wherein the step of analyzing the virtual 3D scene for determining the camera path comprises:
  determining whether the blank region of the image background is at least partially filled as an in-painting region; and
  estimating different leakage ratios of the in-painting region corresponding to how much the in-painting region is observable from different candidate nodes by the virtual camera in the virtual 3D scene.

* * * * *